June 7, 1966 R. A. JEWELL 3,254,904
FOLDING KING PIN
Filed June 8, 1964 2 Sheets-Sheet 1
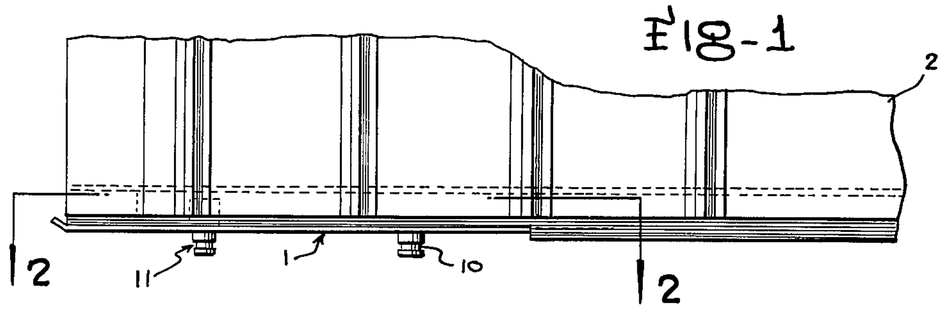
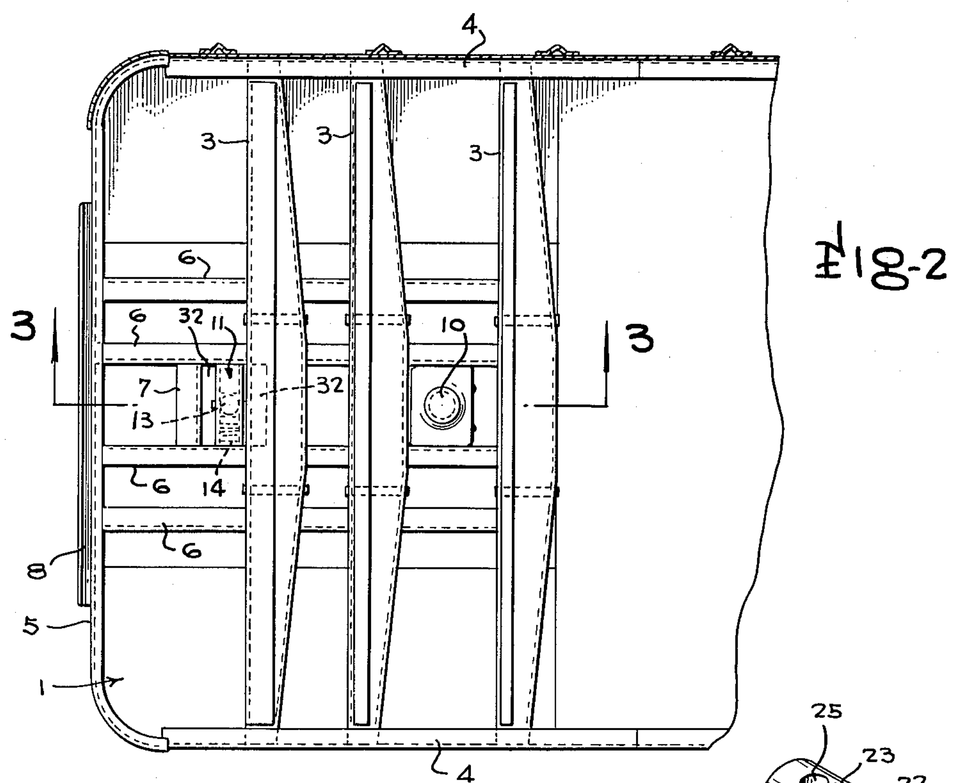
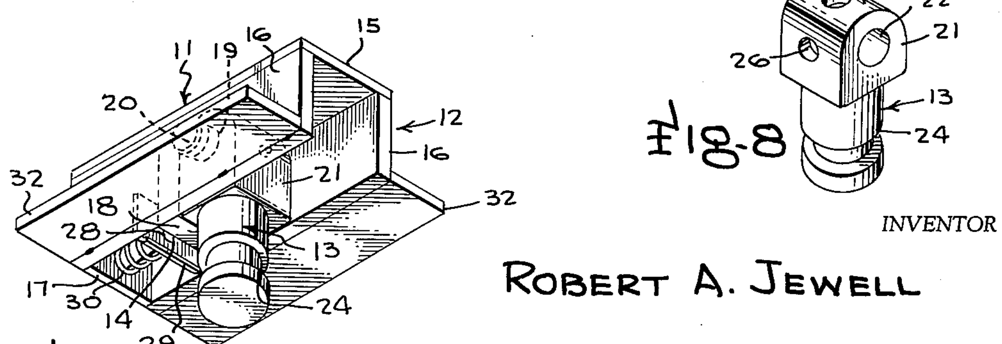
INVENTOR
ROBERT A. JEWELL
BY
Mason, Fenwick & Lawrence
ATTORNEYS FOLDING KING PIN
Filed June 8, 1964 2 Sheets-Sheet 2
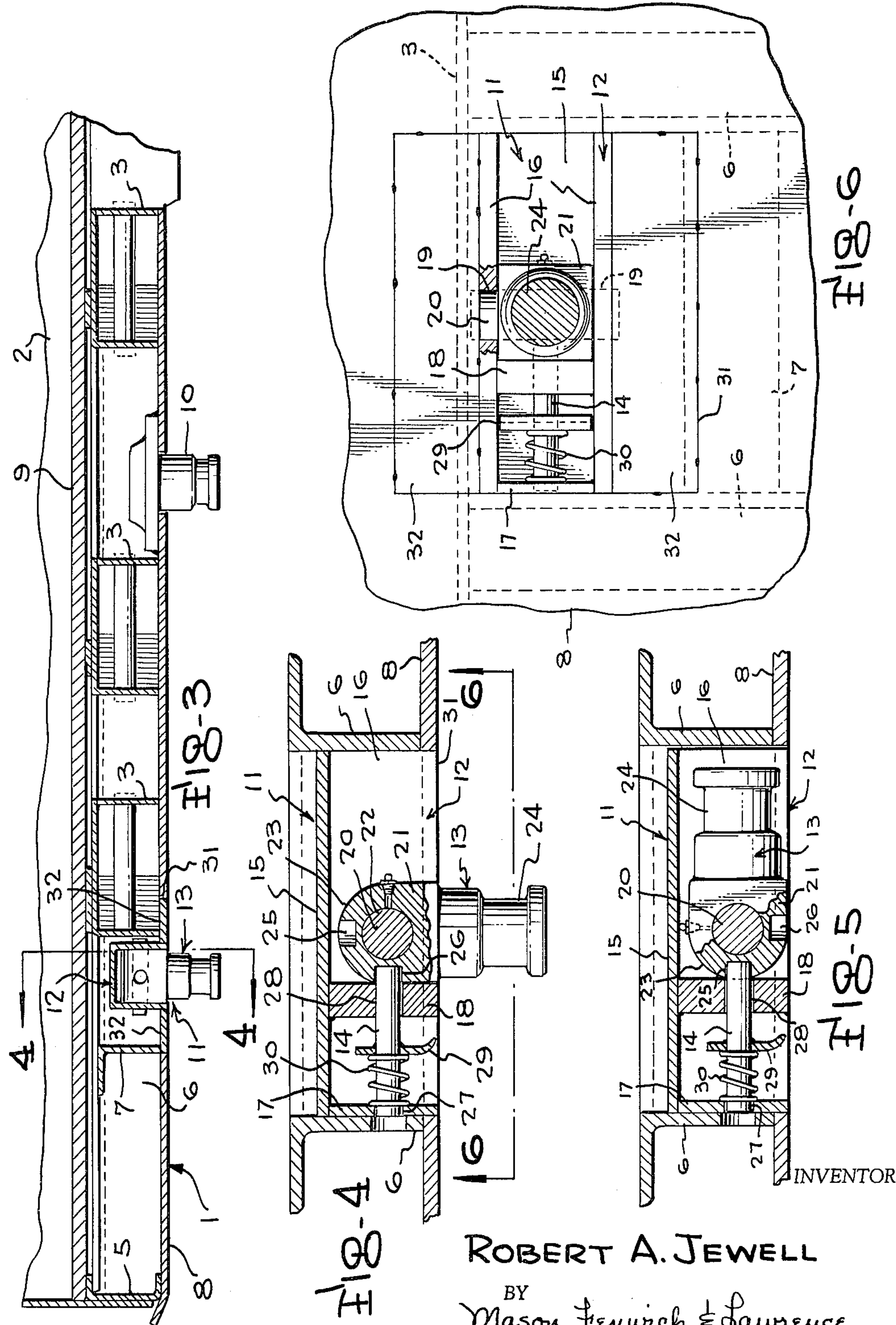

United States Patent Office 3,254,904

Patented June 7, 1966

3,254,904
FOLDING KING PIN

Robert A. Jewell, Savannah, Ga., assignor to Great Dane Trailers, Inc., Savannah, Ga., a corporation of Georgia Filed June 8, 1964, Ser. No. 373,203
5 Claims. (Cl. 280—433)

This invention relates generally to upper fifth wheel assemblies for use with trailers, and particularly to king pins of the folding type for use with these assemblies.

Fifth wheel assemblies having folding king pins have been in use for some time, and an example of such a pin is disclosed in United States Patent No. 2,494,799. The known structures, while operating satisfactorily, have their locking pins controlled by rods which go through the fifth wheel structure and are expensive to install. Further, it is necessary to cut through the trailer floor to get to the unit for removal or re-installation.

The general object of the present invention is to provide a folding king pin unit which can be installed without modification of the present upper fifth wheel plate.

A more specific object is to provide a folding king pin unit that can be installed without drilling holes for control rods, or installing spring-loaded trigger rods through the massive fifth wheel plate.

Another object is the provision of such a structure which can be removed and re-installed as a unit from beneath the trailer without cutting through the trailer floor.

A further object is to provide a housing for the king pin which is in the form of an inverted channel, making it unnecessary to blank off the assembly for insulating above the king pin.

Still another object of the invention is to provide a folding king pin unit which permits unidirectional installation where more than one king pin is to be used.

Other objects of the invention will become apparent from the following description of one practical embodiment thereof, when taken in conjunction with the drawings which accompany, and form part of, this specification.

In the drawings:

FIGURE 1 is a side view of the forward lower portion of a trailer, illustrating an upper fifth wheel in place and the folding king pin of the present invention mounted on the fifth wheel;

FIGURE 2 is a horizontal section through the trailer, taken on the line 2—2 of FIGURE 1, a part of the trailer floor being broken away to expose the fifth wheel;

FIGURE 3 is a longitudinal, vertical section, on an enlarged scale, taken on the line 3—3 of FIGURE 2;

FIGURE 4 is a transverse section on a still larger scale, through the folding king pin unit, and is taken on the line 4—4 of FIGURE 3;

FIGURE 5 is a view similar to FIGURE 4, but showing the king pin in folded, inactive position;

FIGURE 6 is a section on the line 6—6 of FIGURE 4, viewing the underside of the king pin unit and associated fifth wheel structure;

FIGURE 7 is a perspective view of the king pin unit, as seen from beneath; and

FIGURE 8 is a perspective view of the king pin alone, removed from the mounting channel.

In general, the invention consists in a king pin unit which is relatively small and includes a housing carrying a pivotally mounted king pin and the spring-pressed locking pin for holding the king pin in its operative and inoperative positions, that can be quickly installed in a fifth wheel and as quickly removed for repair, or replacement.

Referring to the drawings in detail, there is shown an upper fifth wheel 1 fixed to the underside of a trailer 2 at the forward end in the usual manner. The construction of the fifth wheel is immaterial to the present invention, but it is shown as comprising a plurality of transverse load-bearing bolsters 3, connected to side channels 4. A front framing member 5 joins the two side channels, and the bolsters 3 are connected with one another and with the front framing member 5 by means of braces 6. In front of, and spaced from, the front bolster, there is an angle spacer 7 between the central braces 6. A wear plate 8 spans the lower side of the assembly, and the trailer floor 9 forms a top closure. A stationary king pin 10 is mounted to the rear of the center of the assembly, and a folding king pin unit 11 is mounted in front of the forward bolster, between that bolster and spacer 7, and between the central braces 6.

The folding king pin unit 11 consists of a housing 12, a king pin 13 and a locking pin 14. The housing 12 is in the form of an inverted channel having a top 15 and depending side walls 16. There is an end wall 17 closing one end of the channel, and a bridge wall 18, spaced from the end wall, which traverses the housing and forms a stop to limit rotative movement of the king pin. The side walls 16 of the housing are apertured, as at 19, to receive a pivot pin 20, which mounts the king pin 13 in the housing.

King pin 13 has a mounting body portion 21, which is square in horizontal cross-section and has a hole 22 through it to receive pivot pin 20. The top of the body portion is rounded, as at 23, on an arc which is concentric with pivot pin hole 22. The spacing of the pin-receiving holes 19 from the bridge wall 18 is substantially the same as half the thickness of the body portion of the king pin so that when the king pin is mounted and in vertical position it will contact the bridge wall to prevent further forward rotation of the king pin. Projecting from the mounting body portion of the king pin is the conventional pin shank 24 for locking engagement with the usual lower fifth wheel assembly carried by the tractor (not shown).

The body portion of the king pin has a locking pin seat 25 extending axially of the king pin, and a locking pin seat 26 positioned at right angles to the seat 25. In other words, the seat 25 opens to the top of the body member, while the seat 26 opens to the side of that member which is adjacent the bridge wall 18 when the king pin is in operative position. The bridge wall 18 and the end wall 17 have openings 27 and 28, which are in axial alignment with one another and whose common projected axis intersects the axis of the king pin pivot pin 20. Thus, the openings 27 and 28 will be aligned with the locking pin seat 25 when the locking pin is vertical, as seen in FIGURE 4, and with the locking pin seat 26 when the king pin is rotated 90° to assume a position within the housing, as shown in FIGURE 5. The locking pin 14 is slidably mounted in openings 27 and 28 for seating in, and withdrawal from, the respective seats 25 and 26 in the king pin. A finger-piece 29 is fixed to the locking pin and extends downward to permit easy gripping. A coiled spring 30 on the locking pin between the finger-piece and the end wall 17 urges the locking pin toward locking entry into the king pin seats.

For ease of assembly and removal of the folding king pin, an opening 31 is cut in the wear plate 8 of the fifth wheel the full width of the space between the central two braces 6 and somewhat longer than the distance between the front bolsters 3 and the spacer 7 so that the opening projects beyond the front edge of the channel-shaped bolster and beyond the bottom edge of the angle member spacer 60. By attaching wings 32 along the sides of the housing 12, means are provided to assure the proper position of the king pin unit in the fifth wheel assembly. When the unit is inserted in the opening in the plate 8, the wings 32 will contact the bottom edges of the bolster and spacer to limit the distance the unit can be moved into the assembly and fix its position. The wings can then be welded to the plate to secure the unit to the assembly.

When the unit is mounted, the king pin can be moved to operative or inoperative position by grasping the finger-piece 29 and withdrawing the lock pin. When the finger-piece is released it automatically moves into the seat in the king pin which is in alignment with the lock pin axis. When the king pin is in inoperative position, as shown in FIGURE 5, it is held fully above the bottom of plate 8 so that it will not project to interfere with normal use of the fifth wheel. When it is in operative position, as shown in FIGURE 4, it projects below the plate in the manner of conventional king pins, and is firmly held against the bridge wall 18 so that the wall assumes much of the load during forward travel of the vehicle.

If at any time it is necessary to remove the unit from the assembly, it is only necessary to cut the wings free from the plate 8 to drop the entire unit. After repair, the unit can be replaced and re-welded in position.

The mounting of the pin in a rigid, covered housing, makes possible the unitary handling and mounting of the folding king pin. It also allows freedom of mounting, as all elements are carried by the housing and none need be threaded through openings in the members of the fifth wheel. The top wall of the housing makes it possible to insulate the king pin without blanking off the opening, as the housing serves this purpose.

While in the above, one practical embodiment of the invention has been disclosed, it will be understood that specific details of construction shown and described are merely for purposes of illustration and the invention may take other forms within the scope of the appended claims.

What is claimed is:

1. An upper fifth wheel assembly comprising, a plurality of transversely extending, spaced load bearing bolsters, braces extending at right angles to the bolsters, the bolsters and braces having vertical flanges terminating in a common plane, a wear plate connected to the said flanges, a king pin housing in the form of an inverted channel, a king pin pivotally mounted in the housing for rotative movement to assume an inoperative position wholly within the housing and an operative position projecting from the housing, a locking pin slidably mounted in the housing, said king pin having means engageable by the locking pin to hold the king pin in operative and inoperative positions, and the wear plate having an opening therein and the king pin housing being mounted in the opening.

2. An upper fifth wheel assembly as claimed in claim 1 wherein, the opening in the wear plate exposes portions of the flanges of at least one bolster and brace, and the king pin housing has laterally extending wings seating upon the exposed flanges.

3. A folding king pin unit for use in an upper fifth wheel assembly comprising, a housing of inverted channel shape having an open bottom, a king pin, means pivotally mounting the king pin for swinging movement longitudinally of the housing to assume an operative position projecting downwardly through the open bottom of the housing and an inoperative position lying wholly within the housing, a bridge wall spanning the channel-shaped housing adjacent the king pin to engage the king pin in operative position to limit pivotal movement of the king pin, the housing having an end wall spaced from the bridge wall and the bridge wall and end wall having aligned openings therein, a locking pin slidable in the said openings, and the king pin having locking seats respectively in alignment with the locking pin when the king pin is in its operative and inoperative positions.

4. A folding king pin as claimed in claim 3 wherein, there is means biasing the locking pin toward king pin engaging position.

5. A folding king pin as claimed in claim 4 wherein, there is a finger piece on the locking pin projecting toward the open bottom of the housing.

References Cited by the Examiner

UNITED STATES PATENTS

| | | | |
|---|---|---|---|
| 2,015,313 | 9/1935 | Kinne. | |
| 2,494,799 | 1/1950 | Duvall et al. | 280—433 |
| 2,867,450 | 1/1959 | Tenebaum | 280—433 X |
| 2,981,555 | 4/1961 | Abolins | 280—433 |
| 3,082,020 | 3/1963 | Hulverson et al. | 280—433 |
| 3,135,528 | 6/1964 | Martin | 280—433 |

LEO FRIAGLIA, *Primary Examiner.*